United States Patent
Farkash et al.

(10) Patent No.: US 12,411,851 B2
(45) Date of Patent: Sep. 9, 2025

(54) RANKING INSTANCES OF COMPOSITE SUBTRACTION FORMAT USING RANKED INTERVALS

(71) Applicant: International Business Machines Corporation, Armonk, NY (US)

(72) Inventors: Ariel Farkash, Shimshit (IL); Micha Gideon Moffie, Zichron Yaakov (IL)

(73) Assignee: International Business Machines Corporation, Armonk, NY (US)

( * ) Notice: Subject to any disclaimer, the term of this patent is extended or adjusted under 35 U.S.C. 154(b) by 269 days.

(21) Appl. No.: 18/053,892

(22) Filed: Nov. 9, 2022

(65) Prior Publication Data

US 2024/0152519 A1 May 9, 2024

(51) Int. Cl.
*G06F 21/00* (2013.01)
*G06F 16/2455* (2019.01)
*G06F 16/2457* (2019.01)
*G06F 16/25* (2019.01)
*H04L 9/00* (2022.01)
*H04L 9/06* (2006.01)

(52) U.S. Cl.
CPC .... *G06F 16/2456* (2019.01); *G06F 16/24578* (2019.01); *G06F 16/258* (2019.01); *H04L 9/00* (2013.01); *H04L 9/06* (2013.01)

(58) Field of Classification Search
CPC .......... G06F 16/2456; G06F 16/24578; G06F 16/258; G06F 16/90344; H04L 9/00; H04L 9/06; H04L 9/0894
See application file for complete search history.

(56) References Cited

U.S. PATENT DOCUMENTS

| | | | | |
|---|---|---|---|---|
| 6,101,576 | A * | 8/2000 | Kobayashi | G06F 12/08 358/1.14 |
| 6,779,120 | B1 * | 8/2004 | Valente | H04L 41/0609 726/1 |
| 8,306,356 | B1 * | 11/2012 | Bever | G06V 30/268 382/292 |
| 10,095,925 | B1 * | 10/2018 | Tripuraneni | G06V 30/12 |
| 10,803,102 | B1 * | 10/2020 | Ray | G06F 16/3334 |
| 11,775,977 | B1 * | 10/2023 | Kruse | G06Q 20/4014 705/40 |
| 12,254,110 | B2 | 3/2025 | Farkash et al. | |
| 2015/0012423 | A1 * | 1/2015 | Milam | G06Q 20/40 705/40 |
| 2015/0358159 | A1 * | 12/2015 | Rozenberg | H04L 9/0618 380/28 |

(Continued)

FOREIGN PATENT DOCUMENTS

CN 113204781 A 8/2021

OTHER PUBLICATIONS

Weiss et al., "Practical Solutions for Format-Preserving Encryption", arXiv, Jun. 12, 2015, 10 pages.

(Continued)

*Primary Examiner* — Don G Zhao
(74) *Attorney, Agent, or Firm* — Jeffrey Ingalls (57) ABSTRACT

An example system includes a processor to receive a value formatted using a composite subtraction format. The processor can determine an interval of a number of intervals that corresponds to the received value using minuend rank. The processor can then calculate rank of the value based on the position of the value within the determined interval.

17 Claims, 4 Drawing Sheets

(56) References Cited

U.S. PATENT DOCUMENTS

| | | | |
|---|---|---|---|
| 2016/0232159 A1* | 8/2016 | Parikh | G06F 21/6245 |
| 2017/0214521 A1* | 7/2017 | Busch | H04L 9/0618 |
| 2018/0150836 A1* | 5/2018 | Kumar | G06Q 20/38215 |
| 2018/0316491 A1* | 11/2018 | Pivovarov | G06F 7/588 |
| 2018/0336201 A1* | 11/2018 | Jinka | G06F 16/951 |
| 2019/0147113 A1* | 5/2019 | Baronj | G06F 16/2454 |
| | | | 707/758 |
| 2020/0387525 A1* | 12/2020 | Smith | G06F 16/285 |
| 2021/0226783 A1* | 7/2021 | Levin | H04L 9/3033 |
| 2021/0248154 A1* | 8/2021 | Wu | G06F 16/24578 |
| 2021/0352049 A1* | 11/2021 | Aabye | H04L 63/0414 |
| 2022/0075825 A1* | 3/2022 | Helms | H04L 9/3234 |
| 2022/0075877 A1* | 3/2022 | Helms | G06Q 20/405 |
| 2022/0342780 A1* | 10/2022 | Bartram | G06Q 10/02 |
| 2022/0343015 A1* | 10/2022 | Shahin | H04L 9/0643 |
| 2022/0398107 A1* | 12/2022 | Farkash | G06F 7/02 |
| 2023/0053567 A1* | 2/2023 | Kallas | G06F 16/24564 |
| 2023/0061746 A1* | 3/2023 | Wei | G06F 16/215 |
| 2023/0214516 A1* | 7/2023 | Madiya | H04L 9/088 |
| | | | 726/26 |
| 2024/0013168 A1* | 1/2024 | Oei | G06Q 20/06 |
| 2024/0013221 A1* | 1/2024 | Kruse | G06N 20/00 |
| 2024/0037556 A1* | 2/2024 | Amrutiya | G06Q 20/3821 |
| 2024/0330412 A1* | 10/2024 | Frazier | G06F 18/241 |

OTHER PUBLICATIONS

Wikipedia—The Free Encyclopedia, "Financial Instrument Global Identifier", May 22, 2025, 05 pages, https://en.wikipedia.org/wiki/Financial_Instrument_Global_Identifier.

\* cited by examiner

RANKING INSTANCES OF COMPOSITE SUBTRACTION FORMAT USING RANKED INTERVALS

BACKGROUND

The present techniques relate to composable formats. More specifically, the techniques relate to a subtraction composition.

SUMMARY

According to an embodiment described herein, a system can include processor to receive a value formatted using a composite subtraction format. The processor can also further determine an interval of a number of intervals that corresponds to the received value using minuend rank. The processor can also calculate a rank of the value based on the position of the value within the determined interval.

According to another embodiment described herein, a method can include receiving, via a processor, a value formatted using a composite subtraction format. The method can further include determining, via the processor, an interval of a number of intervals that corresponds to the received value using minuend rank. The method can also further include calculating, via the processor, a rank of the value based on the position of the value within the determined interval.

According to another embodiment described herein, a computer program product for ranking formats can include computer-readable storage medium having program code embodied therewith. The program code executable by a processor to cause the processor to receive a value formatted using a composite subtraction format. The program code can also cause the processor to determine an interval of a number of intervals that corresponds to the received value using minuend rank. The program code can also cause the processor to calculate a rank of the value based on the position of the value within the determined interval.

DETAILED DESCRIPTION

A framework may be capable of defining composable formats. A format, as used herein, is defined in a recursive manner as a hierarchical composition of sub-formats. Each sub-format is a format, and an instance of a composition format or a concrete format. For example, a composition format may be concatenation, union etc. In various examples, a concrete format may be Set, Regex, IntegerDomain, Variable Length String etc. In such a framework, each concrete format, or basic block, may be implemented such that the basic block can match, search, and rank itself. Matching, as used herein, refers to an operation that, given a string, returns a Boolean yes if string is a legal string in the format. Search, as used herein, refers to an operation that, given a text, searches for occurrences of matches. Ranking, as used herein, refers to an operation that, given a string of in a format, produces a unique and consistent integer bound by the size of the domain of the format. The ranking process is reversible. When performing format preserving encryption (FPE), the input is an instance from the domain, and the input can be mapped or transformed to any other instance in the given domain. For example, if the domain is the integer range 100-200, then an example for a valid input is 117, and after FPE, the input can be transformed to 185, 128, or any other legal value in the domain. However, there are cases in which a definition cannot be expressed positively easily or cannot be expressed at all without being enumerated explicitly. For example, one such definition may be more easily expressed as not belonging to a certain set of values.

Two examples of such a definition are the Financial Instrument Global Identifier and the Account ID for application testing in banks. For example, the Financial Instrument Global Identifier (FIGI) (formerly Bloomberg Global Identifier (BBGID)) open standard is a unique identifier of financial instruments including common stock, options, derivatives, futures, etc. The format for FIGI is defined as a concatenation of two uppercase letter from the set [BCDFGHJKLMNPQRSTUVWXYZ], but not the following pairs: BS|BM|GG|GB|GH|KY|VG. The FIGI format includes several more letters and number with a special FIGI check digit at the end. Examining only the first two letters of the input text, defining two regular expressions, and defining that the value should match the first and not the second may be straight forward. However, creating a single regular expression to cover this specification may be much more difficult.

In a second example of such formats, account IDs used by banks in masking data for application testing often have a requirement that the masked value will not already exist in production. However, whereas the format of the Account ID can typically be described by the banks, so that any instance can be validated to be an acceptable Account ID, the definition for an acceptable masked value is that it follows the validation of an Account ID and is not in the list of current production values in the organizational database.

According to embodiments of the present disclosure, a system includes a processor that can receive a value formatted using a composite subtraction format. The processor can determine an interval of a number of intervals that corresponds to the received value using minuend rank. The processor can calculate rank of the value based on the position of the value within the determined interval. Thus, embodiments of the present disclosure enable the ranking of subtract composable formats. In particular, the techniques enable adding a subtraction format as a native format composition. In other words, a subtraction operation may be added as part of the format composition in the framework without losing characteristics of masking, such as reversibility. The techniques thus build on the general format definition described above by adding an additional composite subtraction format. In addition, the techniques include techniques for adding the capability to rank and unrank instances of a composite subtraction format efficiently.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1A:
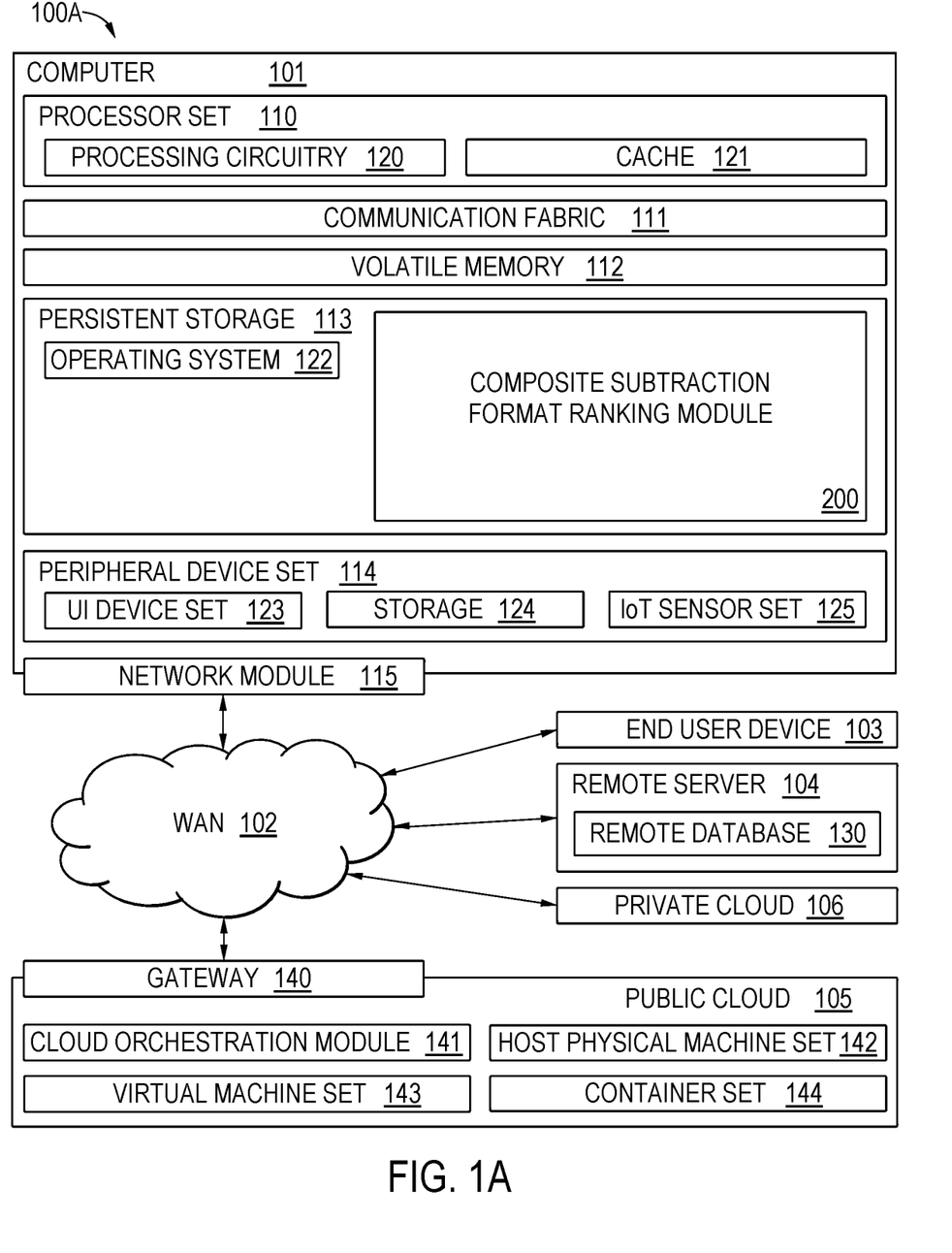
FIG. 1A is a block diagram of an example computing environment that contains an example of an environment for the execution of at least some of the computer code involved in performing the inventive methods, such as subtract composition ranking.

Computing environment 100 contains an example of an environment for the execution of at least some of the computer code involved in performing the inventive methods, such as composite subtraction format ranking module 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future.

Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 1B:
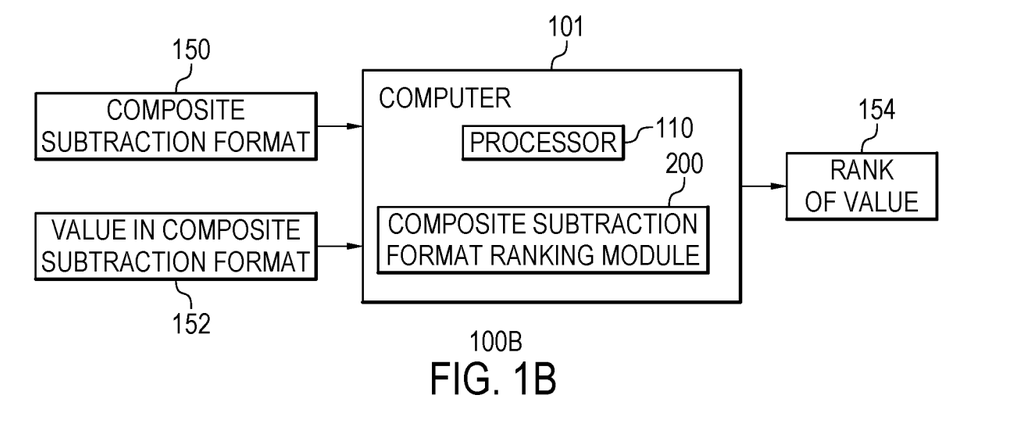
FIG. 1B is a block diagram of an example system for ranking instances of a composite subtraction format.

With reference now to FIG. 1B, a block diagram shows an example system for ranking instances of a composite subtraction format. The example system 100B of FIG. 1B includes elements described with respect to FIG. 1A. In addition, the computer 101 is shown receiving a composite subtraction format 150 and value 152 in the composite subtraction format. In some examples, the composite subtraction format is defined as a binary subtraction composition. For example, the defined composite subtraction format includes a number of formats, where each format is capable of ranking, matching, and searching itself. In various examples, the composite subtraction format is searchable, matchable, and rankable using the techniques described herein. The computer 101 is shown generating a ranking 154 of the value. For example, the rank 154 may be a position of the value 152 with respect to all other possible values in the composite subtraction format 150.

In the example of FIG. 1B, a new format binary composition entity may be used that logically follows the definition of set subtraction. For example, assume A and B are formats. These formats can also be exhaustively described as a set of values: $A=\{a_1, a_2, \ldots, a_n\}$, $B=\{b_1, b_2, \ldots, b_m\}$. Thus, a new format C that defines the result of $A \backslash B$, referred to herein as a composite subtraction format, contains all values from A that are not in B. In various examples, this composite subtraction format can be applied at any level. For example, the composite subtraction format may be applied to an entire format, to a concrete format, or any sub-format at any other level of the hierarchy of a composite format.

In various examples, the processor 110 can preprocess the composite subtraction format to generate the number of intervals, wherein each of the number of intervals has an associated a minuend rank and a true rank. The processor 110 can then receive a value 152 formatted using a composite subtraction format 150. For example, the value includes a string formatted in the composite subtraction format. In particular, the value may belong to a minuend and not a subtrahend of the composite subtraction format. The processor 110 can determine an interval of a number of intervals that corresponds to the received value using minuend rank. The processor 110 can then calculate a rank of the value based on the position of the value within the determined interval. In some examples, the processor 110 can also unrank the composite subtraction format. For example, the rank 154 can be converted back into the original value 152. In various examples, the processor 110 can execute a format-preserving encryption or tokenization on the composite subtraction format using the ranking. In some examples, the processor 110 can mask the value using a rank-then-cipher approach. For example, the rank-then-cipher approach may include to replace the value with an integer corresponding to the rank of the value, apply a cryptographic operation on the integer, and unrank a resulting cipher integer back to a string in a domain of the composite subtraction format. Thus, the format-preserving encryption or tokenization may produce another encrypted value or token that is a valid value within the domain of the composite subtraction format.

It is to be understood that the block diagram of FIG. 1B is not intended to indicate that the system 100B is to include all of the components shown in FIG. 1B. Rather, the system 100B can include fewer or additional components not illustrated in FIG. 1B (e.g., additional computers, processors, values, or additional ranks, etc.).

Figure 2:
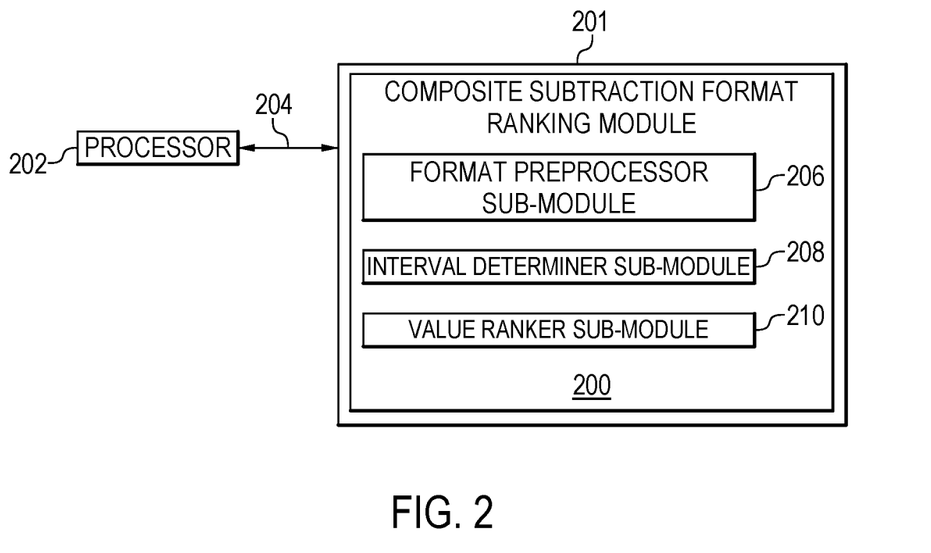
FIG. 2 is an example tangible, non-transitory computer-readable medium that can rank instances of a composite subtraction format.

Referring now to FIG. 2, a block diagram is depicted of an example tangible, non-transitory computer-readable medium 201 that can rank instances of a composite subtraction format. The tangible, non-transitory, computer-readable medium 201 may be accessed by a processor 202 over a computer interconnect 204. Furthermore, the tangible, non-transitory, computer-readable medium 201 may include code to direct the processor 202 to perform the operations of the method 300 of FIG. 3.

The various software components discussed herein may be stored on the tangible, non-transitory, computer-readable medium 201, as indicated in FIG. 2. For example, the composite subtraction format ranking module 200 may include a format preprocessor sub-module 206 includes code to preprocess the composite subtraction format to generate intervals. In various examples, each of the preprocessed intervals has an associated minuend rank and a true rank. In some examples, the format preprocessor sub-module 206 includes code to optimize the intervals by maximizing coverage of contiguous valid value regions given up to a received parameter indicating a maximum number of intervals. The composite subtraction format ranking module 200 may also include an interval determiner sub-module 208 that includes code to receive a value formatted using a composite subtraction format and determine an interval of a number of intervals that corresponds to the received value using minuend rank. In various examples, the interval determiner sub-module 208 includes code to compute a minuend rank and find the corresponding interval of the value using a binary search. The composite subtraction format ranking module 200 may also include a value ranker sub-module 210 includes code to calculate a rank of the value based on the position of the value within the determined interval. In various examples, the value ranker sub-module 210 includes code to return the rank of the value in response to detecting that the value is within a contiguous valid value region. For example, the rank may be the true rank of a start of the interval plus the position of the value in the interval. In some examples, the value ranker sub-module 210 includes code to, in response to detecting that the value is within a contiguous valid value region of a mixed interval, iteratively account for all contiguous subtrahend regions by unranking the minuend, matching the subtrahend, and updating the true rank.

Figure 3:
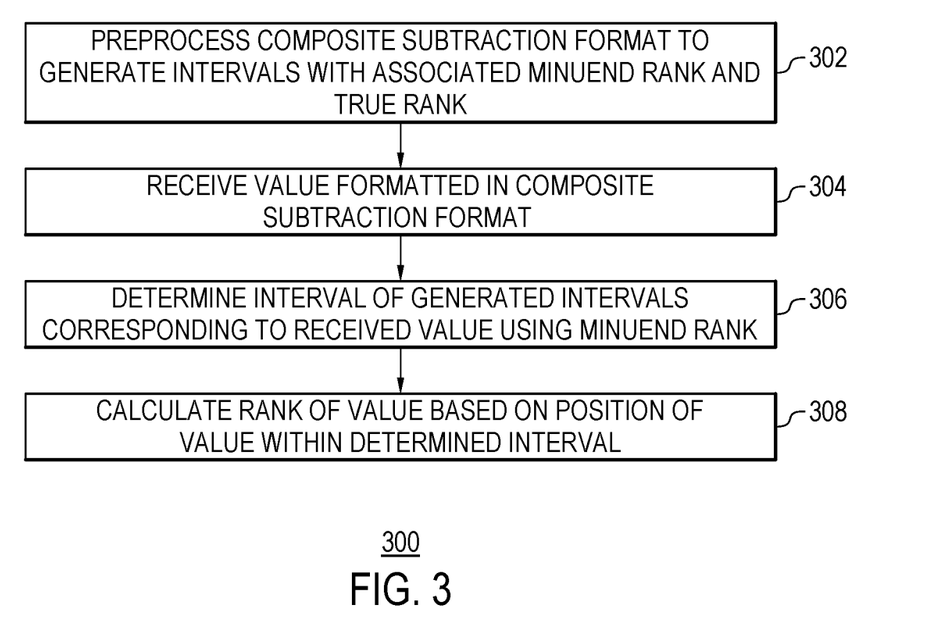
FIG. 3 is a process flow diagram of an example method that can rank composite subtraction formats using ranked intervals.

FIG. 3 is a process flow diagram of an example method that can rank composite subtraction formats using ranked intervals. The method 300 can be implemented with any suitable computing device, such as the computer 101 of FIG. 1. For example, the methods described below can be implemented by the processor set 110 of FIG. 1.

At block 302, a processor preprocesses a composite subtraction format to generate a number of intervals with an associated a minuend rank and a true rank. In some examples, the composite subtraction format includes a binary subtract composition. In various examples, the processor can optimize the intervals by maximizing coverage of contiguous valid value regions given up to a received parameter indicating a maximum number of intervals.

At block 304, the processor receives a value formatted using a composite subtraction format. For example, the value may be an IBAN value, FIGI value, account ID value, or any other value that is expressible as a subtraction of values.

At block 306, the processor determines an interval of the number of intervals that corresponds to the received value using minuend rank. In various examples, the processor can compute a minuend rank and find the corresponding interval using a binary search.

At block 308, the processor calculates rank of the value based on the position of the value within the determined interval. In various examples, in response to detecting that the value is within a contiguous valid value region, the processor can return the rank of the value. For example, the rank includes the true rank of a start of the interval plus the position of the value in the interval. In some examples, in response to detecting that the value is within a contiguous valid value region of a mixed interval, the processor can iteratively account for all contiguous subtrahend regions by unranking the minuend, matching the subtrahend, and updating the true rank.

The process flow diagram of FIG. 3 is not intended to indicate that the operations of the method 300 are to be executed in any particular order, or that all of the operations of the method 300 are to be included in every case. Additionally, the method 300 can include any suitable number of additional operations. For example, the method 300 may additionally include unranking, via the processor, the rank to generate the value that was ranked. In some examples, the method 300 may include masking the value using a rank-then-cipher approach. For example, the rank-then-cipher approach may include to replacing the value with an integer corresponding to the rank of the value, applying a cryptographic operation on the integer, and unranking a resulting cipher integer back to a string in a domain of the composite subtraction format.

Figure 4:
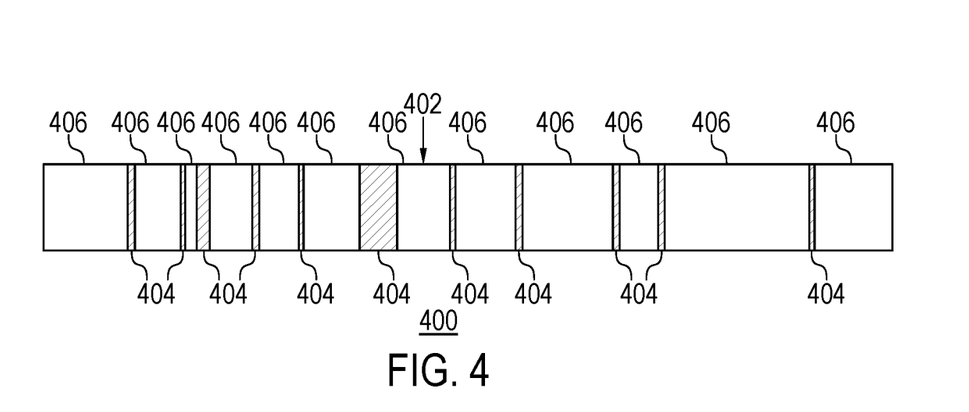
FIG. 4 is a block diagram of an example value to be ranked within a composite subtraction format.

With reference now to FIG. 4, a block diagram shows an example value to be ranked within an example composite subtraction format. The example composite subtraction format 400 of FIG. 4 includes a value 402 to be ranked within the composite subtraction format 400. The composite subtraction format 400 includes contiguous subtrahend regions 404 representing invalid instance values and indicated by shading, and remaining contiguous valid value regions 406 of the composite subtraction format, indicated by solid white blocks. In various examples, each instance of the contiguous subtrahend regions 404 and contiguous valid value regions 406 may be associated with a length parameter indicating a number of instances included in the particular region.

In the example of FIG. 4, the Financial Instrument Global Identifier (FIGI) open standard may be implemented as a composite subtraction format, as one example. The format for FIGI is defined as a concatenation of two uppercase letter from the following set [BCDFGHJKLMNPQRSTUVWXYZ] but not the following pairs: BS|BM|GG|GB|GH|KY|VG. The format for FIGI also includes several more letters and number with a special FIGI check digit at the end. An example snippet of the format definition of the FIGI open standard follows: Concatenation(Arrays.asList(new Subtract(new RegularExpressionFormat("[BCDFGHJKLMNPQRSTUVWXYZ]{2}"), new RegularExpressionFormat("BS|BM|GG|GB|GH|KY|VG")), new RegularExpressionFormat("G[BCDFGHJKLMNPQRSTUVWXYZ0-9]{8}"), new Computed(new RegularExpressionFormat("\\d"))// figi check digit
where the first part of the concatenation is a subtraction composition of BS|BM|GG|GB|GH|KY|VG from [BCDFGHJKLMNPQRSTUVWXYZ]{2}. In other words, the first part of the FIGI open standard is any two letter combination of the minuend except those in the subtrahend. As described above, the composite subtraction format described herein is a format in itself, and therefore includes the ability to implement rank, match and search. The match and search functions for the composite subtraction format may be implemented by delegating to minuend and subtrahend. For example, matches=minuend.match and not subtrahend match. In other words, the match and search functions may delegated such that a value matches only if the value matches the minuend and does not match the subtrahend by definition, but a minuend and subtrahend match operation is given, such that if minuend.match=true and subtrahend.match=false, then a match is detected. Otherwise, a match is not detected. Rank may be a harder task because the subtrahend operation can create holes of contiguous subtrahend regions 404 in a minuend format, as shown in FIG. 4. In particular, the rank of the instance pointed out by the arrow 402 position in the composite subtraction format may be the rank of the minuend minus the number of overlaps where minuend matches subtrahend. In other words, all contiguous valid value regions minus the contiguous subtrahend regions 404 up to the instance indicated by arrow 402. However, to go over all instances at each rank operation may be extremely inefficient, potentially up to the point of making a solution not viable. In order to address this inefficiency, a pre-processing may be applied during format creation in which the rank of all instances is calculated in advance and saved.

A trivial way of ranking of all instances in advance may be to go over all format instances sequentially. For example, the left to right in the image of FIG. 4, where all valid instances raise the rank and contiguous subtrahend regions 404 do not. All these values may be inserted into a map and the map used at runtime. However, this trivial method may take too long for large formats and the map may be too big to fit in memory. In particular, the minuend can be very large. For example, the minuend of credit cards is 2^50 and BritishIBAN is 2^70, etc. Thus, even during creation time, a more efficient method may be used instead.

In some examples, to address the most common use cases, an assumption may be made that the subtrahend format is small enough to enumerate. Thus, an optimal solution may be to collect all contiguous valid value region 406 during format creation. Since the subtrahend can be enumerated, the number of contiguous subtrahend regions 404 may be smaller than or equal to the subtrahend size, and the number of contiguous valid value region 406, even though may be much bigger in size, may be equal to the number of contiguous subtrahend regions 404, plus or minus 1, depending on whether the last region is a contiguous subtrahend region 404 or a contiguous valid value region 406. Therefore, if the true rank (after subtraction of contiguous subtrahend regions 404) of each of the starting point of each of the contiguous valid value regions 406 is saved during format creation, then ranking may become an easy and fast process.

Figure 5:
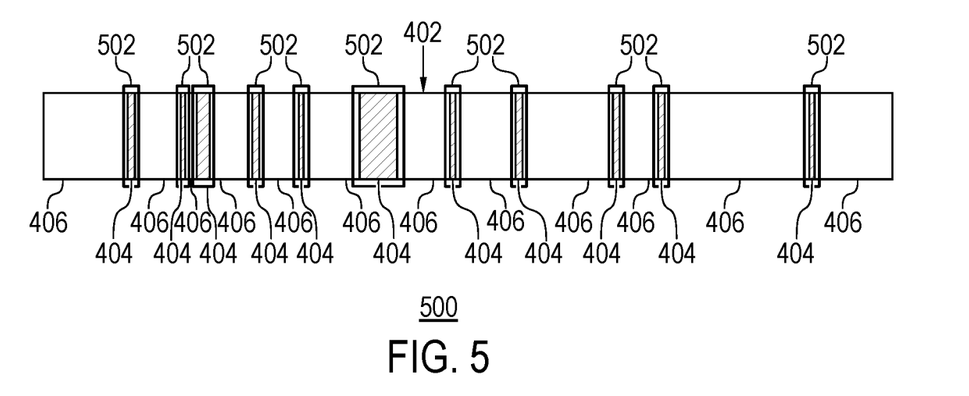
FIG. 5 is a block diagram of an example set of intervals where a parameter K is larger than the number of contiguous subtrahend regions within a composite subtraction format.
Figure 6:
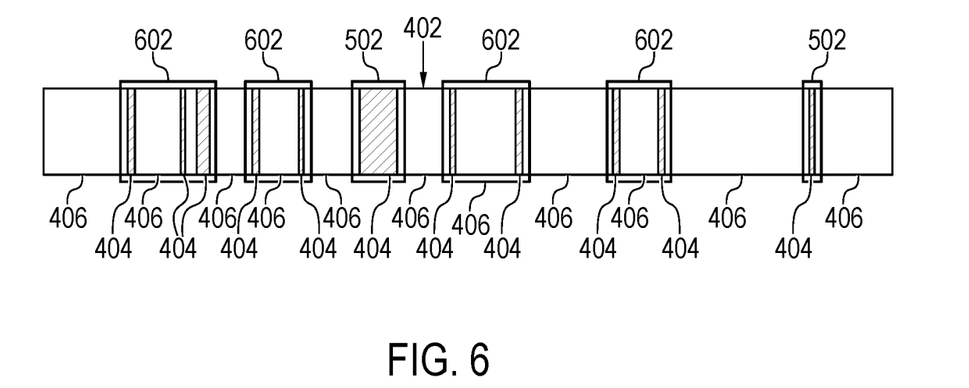
FIG. 6 is a block diagram of an example set of intervals where a parameter K is smaller than the number of contiguous subtrahend regions within a composite subtraction format.

In one example implementation, a method may be used to mark all valid instance intervals with a penalty. The penalty refers to the number of subtrahend matches that are to be removed to compute the true rank of each instance. The method may begin with enumerating the subtrahend. If an instance matches a minuend, then the processor can open a subtrahend region interval of size 1 based on a minuend rank with hits of 1. In response to detecting that the number of contiguous subtrahend regions 404 is larger than a given input parameter K, the processor can double the size of intervals and join intervals that now overlap, adding their accumulated hits to the newly created mixed intervals 602. In some examples, the intervals may overlap transitively. For example, if interval A overlaps with B, and B overlaps with C, then A would join with B. Then, AB would join with C to create one interval ABC. For example, these intervals may include contiguous subtrahend regions 404 only as shown in the example of FIG. 5 or mixed contiguous subtrahend regions 404 and white, as shown in the example of FIG. 6. The processor can then fill rest of format with contiguous valid value region 406. In other words, the rest of the format may be filled with zero hits. The processor can then process the intervals from left to right and assign each interval the total number of penalties up to this point. The result may be white and mixed intervals, each interval has both the minuend rank, and the true rank that is computed during format creation time.

At runtime, the processor receives a string in the composite subtraction format. For example, the string may belong to the minuend and not the subtrahend of the composite subtraction format. The processor can find the corresponding interval in which the string belongs by first computing a minuend rank, which may be a simple ranking operation. The processor may then perform a binary search of the intervals to find the interval corresponding to the string. Then the processor may have two alternatives. First, in most cases, since minuend is much larger than subtrahend, the value 402 may fall in a contiguous valid value region 406, as seen in the example FIG. 4. In this case, the processor may compute the rank of the string as the true rank of the start of the interval plus the position of the string within the interval. In some cases, the value 402 may fall in the white area of a mixed interval. In this case, the processor may account for all the contiguous subtrahend regions 404 up to the position in the interval. In various examples, the processor can account for all the contiguous subtrahend regions 404 up to the position in the interval by moving from either side of the intervals and accounting for hits. For example, the processor can iteratively execute on the interval instances from either end of the interval the operations: unrank minuend, match subtrahend, and update the true rank.

Still referring to FIG. 4, the resulting rank may be a unique rank for the value within the composite subtraction format 400. Therefore, in various examples, the rank may also be converted back to the value 402.

It is to be understood that the block diagram of FIG. 4 is not intended to indicate that the composite subtraction format 400 is to include all of the components shown in FIG. 4. Rather, the composite subtraction format 400 can include fewer or additional components not illustrated in FIG. 4 (e.g., additional intervals, or additional contiguous subtrahend regions, contiguous valid value regions, etc.).

With reference now to FIG. 5, a block diagram shows an example set of intervals where a parameter K is larger than the number of contiguous subtrahend regions within a composite subtraction format. The example composite subtraction format 500 of FIG. 5 includes similarly referenced elements from FIG. 4. In addition, FIG. 5 includes a set of intervals 502. For example, the intervals 502 of FIG. 5 each include one contiguous subtrahend region 404. Although shown in FIG. 5 with some spacing around the edges of the included contiguous subtrahend regions 404 for ease of visibility, the intervals 502 do not include values in the white space around the contiguous subtrahend regions 404.

In various examples, if the subtrahend.size<=K, then as shown in FIG. 5, the techniques described herein result in a perfect fit that is fully optimized. In these examples, the contiguous subtrahend regions 404 cover all subtrahend instances, and thus there are no mixed intervals. Thus, all the valid instances fall in contiguous valid instance regions and therefore the ranking is also a direct operation. This may be very common, and thus the techniques described herein may often result in intervals containing contiguous subtrahend regions as shown in FIG. 5.

It is to be understood that the block diagram of FIG. 5 is not intended to indicate that the composite subtraction format 500 is to include all of the components shown in FIG. 5. Rather, the composite subtraction format 500 can include fewer or additional components not illustrated in FIG. 5 (e.g., additional intervals, or additional contiguous subtrahend regions, contiguous valid value regions, etc.).

With reference now to FIG. 6, a block diagram shows an example set of intervals where a parameter K is smaller than the number of contiguous subtrahend regions within a composite subtraction format. The example composite subtraction format 600 of FIG. 6 includes similarly referenced elements of FIGS. 4 and 5. In addition, FIG. 6 includes mixed intervals 602 including both white regions and contiguous subtrahend regions 404. Although shown with some spacing around the edges of each included contiguous subtrahend region 404 for ease of visibility, the intervals 502 do not include values in the white space around the contiguous subtrahend region 404 and the intervals 602 do not include valid values in the white space outside the pairs of contiguous subtrahend regions 404.

In various examples, the processor may limit the number of intervals to a parameter K. In particular, some intervals may include mixed intervals containing both contiguous subtrahend regions 404 as well as contiguous valid instance regions 406. In some examples, the processor may maximize coverage of contiguous valid value region 406 given up to a received parameter K number of intervals. For example, while number of contiguous subtrahend regions 404 is larger than a given input parameter K, the processor may double the size of the intervals, join regions that now overlap, and add their accumulated hits to the newly created regions. These resulting intervals may be intervals 502 containing only contiguous subtrahend regions 404 or mixed intervals 602 containing both a contiguous valid value region 406 and a contiguous subtrahend region 404.

It is to be understood that the block diagram of FIG. 6 is not intended to indicate that the composite subtraction format 600 is to include all of the components shown in FIG. 6. Rather, the composite subtraction format 600 can include fewer or additional components not illustrated in FIG. 6 (e.g., additional intervals, or additional contiguous subtrahend regions, contiguous valid value regions, etc.).

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising processing circuitry configured to:
    apply pre-processing during a creation of a format, the pre-processing including calculating and saving the ranks of all instances, and collecting all continuous valid value regions;
    receive a composite subtraction format that includes values from the format that is capable of value matching, where second values from a second format are subtracted from the values;
    receive one of the values that is formatted using the composite subtraction format;
    determine an interval of a plurality of intervals that corresponds to the received value using minuend rank;
    calculate a rank of the received value based on a position of the received value within the determined interval;
    mask the received value by using a format preserving encryption that includes using a rank-then-cipher approach, wherein the rank-then-cipher approach replaces the received value with an integer corresponding to the rank of the received value, and then applying a cryptographic operation on the integer; and
    unrank a resulting cipher integer back to a string in a domain of the composite subtraction format.

2. The system of claim 1, wherein the composite subtraction format is defined as a binary subtraction composition.

3. The system of claim 2, wherein the composite subtraction format comprises a plurality of formats, wherein each format is capable of ranking, and searching itself.

4. The system of claim 1, wherein the received value belongs to a minuend and not a subtrahend of the composite subtraction format.

5. The system of claim 1, wherein the processor preprocesses the composite subtraction format to generate the plurality of intervals, wherein each of the plurality of intervals has an associated a minuend rank and a true rank.

6. A computer-implemented method, comprising:
    applying pre-processing during a creation of a format, the pre-processing including calculating and saving the ranks of all instances, and collecting all continuous valid value regions;
    receiving, via a processor, a composite subtraction format that includes values from a format that is capable of value matching, where second values from a second format are subtracted from the values;
    receiving, via the processor, one of the values that is formatted using the composite subtraction format;
    determining, via the processor, an interval of a plurality of intervals that corresponds to the received value using minuend rank; and
    calculating, via the processor, a rank of the received value based on a position of the received value within the determined interval;
    masking the received value by using a format preserving encryption that includes using a rank-then-cipher approach, wherein the rank-then-cipher approach replaces the received value with an integer corresponding to the rank of the received value, and then applying a cryptographic operation on the integer; and
    unranking a resulting cipher integer back to a string in a domain of the composite subtraction format.

7. The computer-implemented method of claim 6, further comprising preprocessing, via the processor, the composite subtraction format to generate the plurality of intervals, wherein each of the plurality of intervals has an associated minuend rank and a true rank.

8. The computer-implemented method of claim 6, further comprising optimizing the plurality of intervals by maximizing coverage of the contiguous valid value regions are controlled by a received parameter indicating a maximum number of intervals.

9. The computer-implemented method of claim 6, wherein determining the interval comprises computing a minuend rank and finding the corresponding interval using a binary search.

10. The computer-implemented method of claim 6, comprising in response to detecting that the value is within one of the contiguous valid value regions, returning the rank of the value, wherein the rank comprises the true rank of a start of the interval plus the position of the value in the interval.

11. The computer-implemented method of claim 6, comprising in response to detecting that the value is within a white section of a mixed interval, iteratively accounting for all contiguous subtrahend regions by unranking the minuend, matching the subtrahend, and updating the true rank.

12. A computer program product for ranking formats, the computer program product comprising a computer-readable storage medium having program code embodied therewith, the program code executable by a processor to cause the processor to:
    apply pre-processing during a creation of a format, the pre-processing including calculating and saving the ranks of all instances, and collecting all continuous valid value regions;
    receive a composite subtraction format that includes values from a format that is capable of value matching, where second values from a second format are subtracted from the values;
    receive one of the values that is formatted using the composite subtraction format;
    determine an interval of a plurality of intervals that corresponds to the received value using minuend rank;

calculate a rank of the received value based on a position of the received value within the determined interval;

mask the received value by using a format preserving encryption that includes using a rank-then-cipher approach, wherein the rank-then-cipher approach replaces the received value with an integer corresponding to the rank of the received value, and then applying a cryptographic operation on the integer; and unrank a resulting cipher integer back to a string in a domain of the composite subtraction format.

13. The computer program product of claim 12, further comprising program code executable by the processor to preprocess the composite subtraction format to generate the plurality of intervals, wherein each of the plurality of intervals has an associated minuend rank and a true rank.

14. The computer program product of claim 12, further comprising program code executable by the processor to optimize the plurality of intervals by maximizing coverage of the contiguous valid value regions are controlled by a received parameter indicating a maximum number of intervals.

15. The computer program product of claim 12, further comprising program code executable by the processor to compute a minuend rank and find the corresponding interval of the value using a binary search.

16. The computer program product of claim 12, further comprising program code executable by the processor to return the rank of the value in response to detecting that the value is within one of the contiguous valid value regions, wherein the rank comprises the true rank of a start of the interval plus the position of the value in the interval.

17. The computer program product of claim 12, further comprising program code executable by the processor to iteratively account for all contiguous subtrahend regions by unranking the minuend, matching the subtrahend, and updating the true rank, in response to detecting that the value is within a white section of a mixed interval.

* * * * *